United States Patent [19]

Dolivo et al.

[11] Patent Number: 4,890,299
[45] Date of Patent: Dec. 26, 1989

[54] FAST TIMING ACQUISITION FOR PARTIAL-RESPONSE SIGNALLING

[75] Inventors: Francois B. Dolivo, Wadenswil; Gottfried Ungerboeck, Langnau a.A, both of Switzerland

[73] Assignee: International Business Machines Corporation, Armonk, N.Y.

[21] Appl. No.: 237,601

[22] Filed: Aug. 25, 1988

[30] Foreign Application Priority Data

Nov. 13, 1987 [CH] Switzerland ............... 871167/83

[51] Int. Cl.$^4$ ........................................ H04L 25/34
[52] U.S. Cl. ........................................ 375/18; 341/50
[58] Field of Search ................. 375/17, 18, 19, 20, 375/34, 102; 370/48, 56; 341/50, 59, 51; 371/60, 62, 64; 328/162

[56] References Cited

U.S. PATENT DOCUMENTS

| | | | |
|---|---|---|---|
| 4,123,710 | 10/1978 | Stuart et al. | 375/18 |
| 4,472,813 | 9/1984 | Koike et al. | 341/50 |
| 4,571,734 | 2/1986 | Dolivo et al. | 341/50 |
| 4,609,907 | 9/1986 | Adler et al. | 375/18 |
| 4,644,564 | 2/1987 | Dolivo et al. | 341/51 |

OTHER PUBLICATIONS

Mueller et al., "Timing Recovery in Digital Synchronous Data Receivers", IEEE TRANSACTIONS ON COMMUNICATIONS, vol. COM-24, No. 5, May 1976, pp. 516–531.
Gardner, "Hangup in Phase-Lock Loops", IEEE TRANSACTIONS ON COMMUNICATIONS, vol. COM-25, No. 10, Oct. 1977, pp. 1210–1214.
Kabal et al, "Partial-Response Signaling", IEEE TRANSACTIONS ON COMMUNICATIONS, vol. COM-23, No. 9, Sep. 1975, pp. 921–934.
Forney, Jr., "Maximum-Likelihood Sequence Estimation of Digital Sequences . . . ", IEEE TRANSACTIONS ON INFORMATION THEORY, vol. IT-18, No. 3, May 1972, pp. 363–378.
Wood et al., "Viterbi Detection of Class IV Partial Response on a Magnetic Recording Channel", IEEE TRANSACTIONS ON COMMUNICATIONS, vol. COM-34, No. 5, May 1986, pp. 454–461.

Primary Examiner—Robert L. Griffin
Assistant Examiner—Stephen Chin
Attorney, Agent, or Firm—Henry E. Otto, Jr.

[57] ABSTRACT

An apparatus and a method for fast acquisition of the sample-timing phase in systems using partial-response signalling are disclosed. For fast initial adjustment of the timing phase, a known preamble is transmitted. During that phase, previous schemes could occasionally hang up for an extended period of time at the unstable equilibrium point halfway between the desired sampling times. The new procedure eliminates the hangup problem by introducing a hysteresis effect which greatly diminishes the probability of reversals in the once chosen direction of timing-phase adjustment. Thus, reliable adjustment of the timing phase with a much shorter preamble is achieved. The apparatus for furnishing a timing correction signal $\Delta\tau_n$ includes a timing gradient generator portion (41) and a data sample reconstruction portion (43). The data sample reconstruction portion (43) develops a present reconstructed data sample $\hat{x}_n$ from the present received signal sample $y_n$ and a previous reconstructed data sample. The output $\hat{x}_n$ of the data sample reconstruction portion is delayed and furnished to the gradient generation portion (41) which also receives the present received signal sample $y_n$ and a delayed received signal sample, for generating the timing correction signal $\Delta\tau_n$.

16 Claims, 5 Drawing Sheets

DATA SIGNAL: $x(t)$
SAMPLE: $x_n$
SLOPE: $\overset{\circ}{x}_n = -(\pi/2T)x_{n-1}$
RECEIVED SAMPLE: $Y_n(\tau) = x(nT+\tau) + \text{NOISE}$
PREAMBLE: $\{a_n\} = \{\ldots +1, +1, -1, -1, \ldots\}$

FAST TIMING ACQUISITION FOR PARTIAL-RESPONSE SIGNALLING

FIELD OF THE INVENTION

The present invention relates to timing acquisition in receivers of data transmission or recording systems. In particular, it relates to timing acquisition in receivers of such systems which use partial-response signalling.

BACKGROUND OF THE INVENTION

Partial-response (PR) signalling allows a better handling of intersymbol interference and leads to a more efficient utilization of the bandwidth of a given channel. In PR systems a controlled amount of interference can be allowed. As the intersymbol interference then is known, the receiver can take it into account. PR signalling in communications permits transmission at the Nyquist rate, and provides an attractive trade-off between error probability and available bandwidth. PR signalling is extensively used in data transmission systems, such as Pulse Code Modulation (PCM) systems, and will find wide application in recording systems.

A general description of partial-response signalling principles is given by P. Kabal and S. Pasupathy in "Partial-Response Signaling", IEEE Transactions on Communications, Vol.COM-23, No. 9, Sept. 1975, pp. 921-934.

The maximum-likelihood sequence detection (MLSD) technique for the recovery of the transmitted data sequence in receivers of transmission or recording systems using PR signalling has been described by several authors, e.g. G. D. Forney in "Maximum-Likelihood Sequence Estimation of Digital Sequences in the Presence of Intersymbol Interference", IEEE Transactions on Information Theory, Vol.IT-18, No. 3, May 1972, pp. 363-378, and R. W. Wood and D. A. Petersen in "Viterbi Detection of Class IV Partial Response on a Magnetic Recording Channel", IEEE Transactions on Communications, Vol. COM-14 (1986), pp. 454-461.

An important task in a digital data receiver is the provision of the correct timing phase for sampling the signal furnished by a transmission or recording channel. Initially, the timing phase bears no relation to the timing of the received signal. The system must yet be brought into synchronism. For fast synchronization, a known training sequence is transmitted/recorded prior to the actual data sequence. A large phase correction may be necessary for initial adjustment—"acquisition"—of the timing phase. Once the timing phase has been acquired, small corrections are necessary for compensating—"—tracking" —small differences between the rate of the signal received and the frequency of the free-running sampling clock of the receiver. The receiver clock is usually provided by a variable frequency oscillator (VFO).

A problem may occur during timing-phase acquisition when the initial sampling phase occurs at the point halfway between the desired sampling times. Then, the mechanism correcting the phase may reverse its direction of adjustment several times and the timing phase remains in the vicinity of this unstable equilibrium point for an extended period of time. Although this hangup effect occurs rarely, the length of the training sequence must be chosen such that the system may still synchronize in this situation. The hangup effect thus poses a major problem when fast and reliable synchronization is needed.

The article "Timing Recovery in Digital Synchronous Receivers" by K. H. Mueller and M. Mueller, published in the IEEE Transactions on Communications, Vol.COM-24 (1976), pp. 516-531, describes methods for adjusting the timing phase in synchronous digital data receivers for systems free of intersymbol interference. It does not mention the hangup problem or present methods to overcome it. This problem is described, for example, in the paper "Hangup in Phase-Lock Loops" by F. M. Gardner, IEEE Transactions on Communications, Vol.COM-25 (1977), pp. 1210-1214. However, the method proposed to overcome hangups has the drawback of requiring two phase detectors in quadrature, thus increasing the receiver complexity.

OBJECTS OF THE INVENTION

It is an object of the present invention to provide methods and apparatus for avoiding the hangup problem during the timing acquisition phase in receivers for transmission or recording systems using partial-response signalling.

It is a further object to provide, for PR signalling systems, timing acquisition methods and apparatus which enable a fast and correct initial setting of the receiver sampling time under all circumstances, so that reliable synchronization can be achieved with the use of a short training sequence.

Another object is to provide such timing acquisition apparatus and methods which can be simply implemented.

SUMMARY OF THE INVENTION

The method, according to the invention, achieves these objectives by the usage of a special training sequence and the generation of a timing gradient for updating the sampling phase. The timing gradient $\Delta\tau$ for updating the sampling phase $\tau$ is generated from at least one present and one previous received signal sample, and from at least one reconstructed data sample which itself depends on earlier reconstructed data samples. It should be noted that these reconstructed data samples are different from the values $a_n$ of the actual output data sequence which are obtained by subsequent maximum-likelihood sequence estimation.

In particular embodiments, each new reconstructed data sample is obtained by first selecting at least one threshold value $\eta$ in dependence of the sign of a previous reconstructed data sample, and then selecting one of the nominal data signal amplitude values (e.g. $+2/-2$ or $+2/0/-2$) in dependence of the relation between the selected threshold value (or values) $\eta$ and the amplitude of the just received signal sample.

A simple means and method provide a hysteresis effect which prevents reversals of the once chosen direction of timing-phase adjustment for any initial sampling phase and thus eliminates the hangup problem.

The length of the training sequence required for reliably adjusting the sampling phase when applicants' method is used is only one third of the length which is otherwise necessary. This allows for faster and more efficient operation of systems using partial-response signalling.

Other features and advantages of the invention will become apparent from the following detailed description of preferred embodiments, thereof, which are disclosed in connection with the accompanying drawings.

DETAILED DESCRIPTION

(1) Principles

In a maximum-likelihood sequence-detection (MLSD) receiver for data transmission or recording systems using partial-response (PR) signalling, the signal at the output of the receive filter is sampled at the signalling rate for further processing by a Viterbi decoder. In the receiver, a timing recovery scheme adjusts the phase of the sampling clock so that the received signal is sampled at appropriate instants of time. Thereby, any small difference between the rate of the signal received and the frequency of the free-running sampling clock, often provided by a voltage-controlled oscillator (VCO), is also compensated. For fast initial acquisition of the timing phase, a preamble preceding the user data is transmitted, and a special timing procedure is employed.

By present invention, new timing-phase acquisition procedures are introduced for a variety of PR signalling schemes. The new phase acquisition procedures permit reliable timing-phase adjustment during the initial acquisition interval with a preamble whose length needs typically to be only one third of the length required with earlier schemes.

The timing phase is updated by timing gradients computed from the received PR signal samples and reconstructed data samples obtained by threshold decisions. A fixed decision threshold could be use for these decisions, e.g. the value zero. However, when initial sampling occurs halfway between the desired sampling times, the timing gradients could randomly reverse their sign. The timing phase could hang up at this unstable equilibrium point for an extended period of time. This hangup effect, although seldomly occurring, poses a major problem when fast acquisition with high reliability is needed.

According to the present invention, by making the decision thresholds dependent on past reconstructed data samples, a hysteresis effect is introduced. This makes reversals of the once chosen direction of timing-phase adjustment very unlikely for any initial sampling phase and thus eliminates the hangup problems.

As used herein, i and j are positive integer time indices and n is an integer time index that may be positive or negative. Note that n is the running index for the signal samples (it has no limit); whereas N designates the (preselected, fixed) number of received samples which are used for evaluation at any time. Thus, there is no relation between N and n, and any other letter instead of N (e.g., K) could be selected, if preferable. Also, $y_n$ and $y_n(\tau)$ have the same meaning, with $y_n$ merely being a shorthand term for $y_n(\tau)$.

Figure 1:
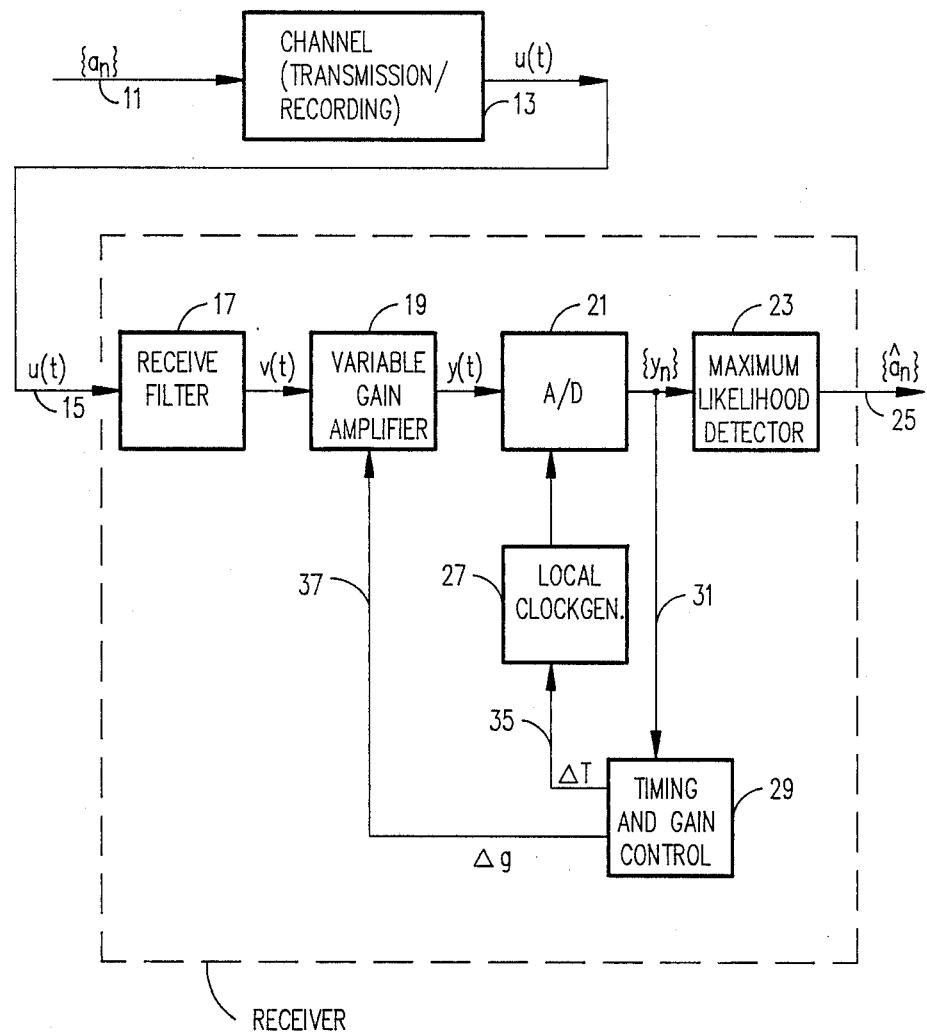
FIG. 1 is a schematic block diagram of a recording or communication system in which present invention finds application.

FIG. 1 shows a block diagram of a partial-response signalling system as briefly described above. A sequence of data values $\{a_n\}$ is applied to the input 11 of a transmission or recording channel 13. The output signal u(t) of that channel is applied to the input 15 of the receiver. In the receiver, the input signal is first filtered in a receive filter 17 furnishing signal v(t) which is applied to a variable gain amplifier 19 to obtain signal y(t). That signal is sampled in A-to-D converter 21, furnishing received signal samples $\{y_n\}$. In a maximum-likelihood detector 23, a sequence of data values $\{a_n\}$ is obtained and available on output 25 of the receiver.

A local clock generator 27 (including a variable frequency oscillator) provides the sampling clock to the A-to-D converter 21. For adjusting the local clock phase and the gain, timing and gain control 29 is provided. It receives on its input 31 received signal samples $\{y_n\}$ and furnishes timing control signal $\Delta\tau_n$ on output 35 to the local clock generator and gain control signal $\Delta g$ on output 37 to the variable gain amplifier.

The invention is only concerned with initial timing phase acquisition, and thus in the following only those portions and functions of the receiver which are required for the generation of timing control signal $\Delta\tau_n$ will be described in detail.

(2) Survey of Partial-Response Signalling Schemes

Figure 2A:
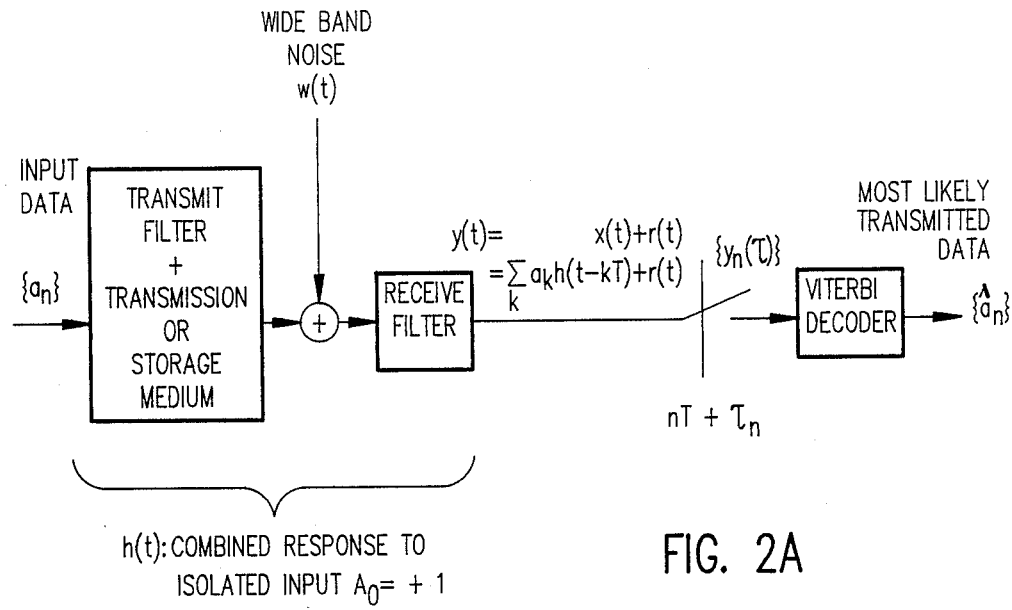
FIGS. 2A and 2B depict the partial-response signalling system and schemes, respectively.

Partial-response (PR) signalling systems can be modeled as shown in FIG. 2. The data sequence $\{a_n\}$ is sent at the signalling rate 1/T through the transmit filter, transmission or storage medium, and band-limiting receive filter. Five PR schemes are considered here.

PR-I denotes PR signalling of type "duobinary" or "class 1". For this scheme, the response of the overall channel-consisting of transmit filter, transmission or storage medium, and receive filter-to an isolated input signal $a_o = +1$ is given by $$h_I(t) = p(t) + p(t-T), \quad (1)$$

where $$p(t) = \frac{\sin(\pi t/T)}{\pi t/T} \cdot \frac{\cos(\zeta \pi t/T)}{1 - 4\zeta^2 t^2/T^2} \quad (2)$$

The parameter $\zeta$ defines the excess bandwidth, i.e. above the frequency $(1+\zeta)/2T$, the spectrum of p(t) is zero.

PR-II, also known as "class 2", is defined by the overall channel response $$h_{II}(t) = p(t) + 2p(t-T) + p(t-2T), \quad (3)$$

PR-III, or "dicode", by $$h_{III}(t) = p(t) - p(t-T), \quad (4)$$

PR-IV, or "modified duobinary", or "class 4", by $$h_{IV}(t) = p(t) - p(t-2T), \quad (5)$$

and EPR-IV, or "extended PR-IV", by $$h_{E-IV}(t) + p(t-T) - p(t-2T) - p(t-3T). \quad (6)$$

If the signals $\{a_k\}$ are transmitted at rate 1/T, the output of the overall channel becomes $$y(t) = x(t) + r(t), \quad (7)$$

where in the signal part $$x(t) = \sum_k a_k h(t - kT), \quad (8)$$

h(t) corresponds to one of the five responses given by (1) and (3)–(6). In (7), r(t) denotes noise, band-limited by the receive filter. The output of the receive filter, sampled at time $nT + \tau$, is denoted by $$y_n(\tau) = y(nT + \tau). \quad (9)$$

At time nT, the data signal is $$x_n = x(nT) = \sum_m h_m a_{n-m}, \quad (10)$$

where $h_m = h(mT)$. For the PR schemes considered here:

$$x_n = \begin{cases} a_n + a_{n-1} & PR - I, \\ a_n + 2a_{n-1} + a_{n-2} & PR - II, \\ a_n - a_{n-1} & PR - III, \\ a_n - a_{n-2} & PR - IV, \\ a_n + a_{n-1} - a_{n-2} - a_{n-3} & EPR - IV. \end{cases} \quad (11)$$

The slope of the data signal x(t) at time nT is given by $$\dot{x}_n = \sum_m \dot{h}_m a_{n-m} \quad (12)$$

$$\dot{h}_m = \frac{dh(t)}{dt} \bigg|_{t = mT}. \quad (13)$$

Figure 2B:
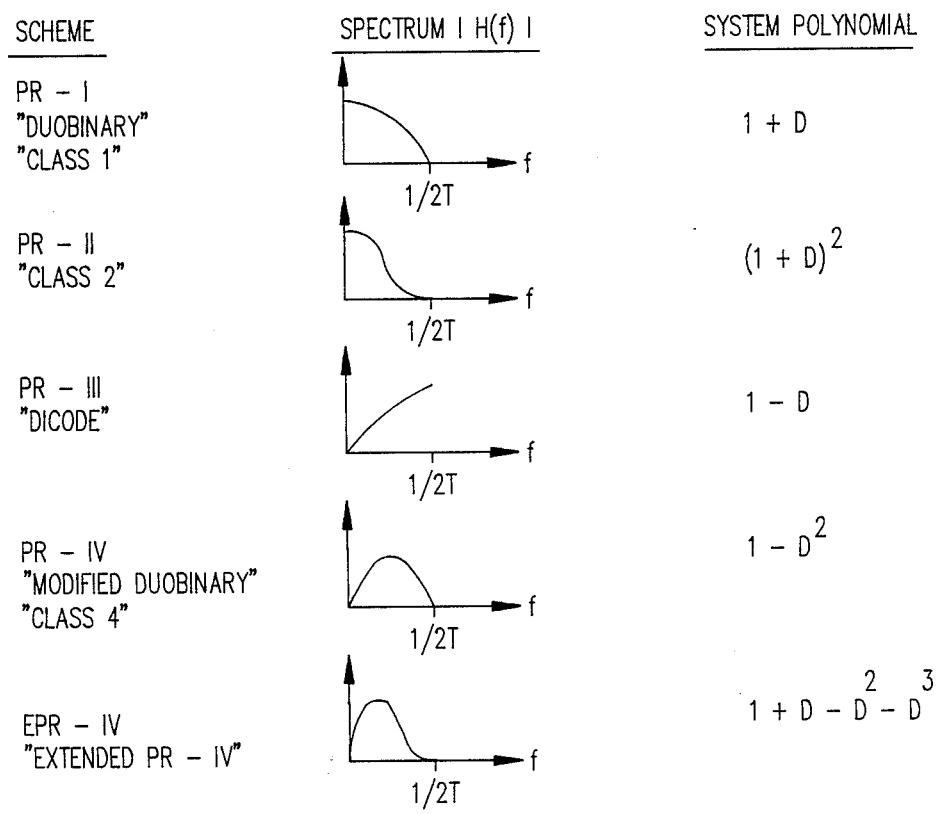

The respective amplitude spectra for the introduced PR channel responses with $\zeta = 0$ (no excess bandwidth) and the corresponding system polynomials are shown in FIG. 2B. The spectra of PR-I and PR-II have low-pass characteristics with a null at $\frac{1}{2}T$. These schemes are well suited for magneto-optic recording channels. PR-IV and EPR-IV exhibit spectral nulls at DC and at $\frac{1}{2}T$. They are well suited for channels with baseband characteristics such as magnetic recording channels.

(3) Timing Procedure

The timing-phase adjustment scheme results from applying the stochastic gradient technique to minimize the mean-squared error $E\{e_n^2(\tau)\}$ where $$e_n(\tau) = y_n(\tau) - \hat{x}_n \quad (14)$$

represents the error signal, and $\hat{x}_n$ denotes a reconstruction of $x_n$ (see relation (10)) made by the receiver. The stochastic gradient with respect to the sampling phase $\tau$ is given by $$\frac{1}{2} \frac{de_n^2(\tau)}{d\tau} = e_n(\tau) \dot{y}_n(\tau). \quad (15)$$

This would require sampling a time derivative of the received signal. Using instead of $\dot{y}_n(\tau)$ a reconstruction $\hat{\dot{x}}_n$ of the slope (12) results in a major simplification. Thus, an approximate stochastic gradient $$\Delta \tau_n = e_n(\tau) \hat{\dot{x}}_n = [y_n(\tau) - \hat{x}_n] \hat{\dot{x}}_n \quad (16)$$

is obtained. In the next sections, there are disclosed methods and arrangements to obtain $\hat{x}_n$ and $\hat{\dot{x}}_n$ directly from the samples $y_n(\tau)$ that result from receiving in the acquisition phase a suitable preamble sequence.

The approximate stochastic gradient is used to update the timing phase $\Delta$ by:

$$\tau_{n+1} = \tau_n - \alpha \Delta \tau_n - \Delta T_n, \quad (17)$$

$$\Delta T_{n+} = \Delta T_n + P \Delta \tau_n. \quad (18)$$

These equations describe the operation of a second-order type II timing-control loop. $\alpha$ and P are the loop gains. The term $\Delta T_n$ compensates for offset between the rate of the received signal and the frequency of the free-running receiver oscillator. For acquisition mode, the loop gains $\alpha$ and P are optimized to achieve fastest convergence of $\tau_n$ and $\Delta T_n$, or equivalently, steepest reduction of the mean-squared error $E\{e_n^2(\tau)\}$.

(4) Acquisition of Sampling Phase Timing Gradients for PR-II and PR-IV

Figure 3:
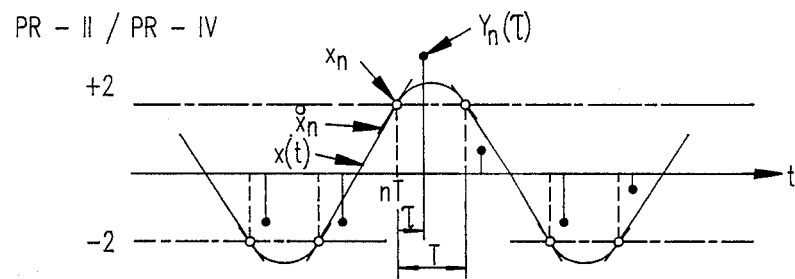
FIG. 3 shows the receiver signals for PR-II and PR-IV during preamble transmission.

For initial acquisition of the timing phase, the preamble sequence $$\{a_n\} = \{\ldots +1, +1, -1, -1, +1, +1, \ldots\} \quad (19)$$

is used. The signals resulting from receiving this preamble are shown in FIG. 3. The spectrum of the preamble comprises lines at $\pm\frac{1}{4}T$, $\pm\frac{3}{4}T$, $\pm 5/4T$, etc. Hz. If bandwidth is limited to $|f| < \frac{3}{4}T$ (corresponding to an excess bandwidth parameter $\zeta \leq 0.5$), the data signal x(t) is a pure sinewave of frequency $\frac{1}{4}T$, and the data and slope signals (11) and (12) are given by $$x_n = \begin{cases} 2a_{n-1} = \ldots -2, +2, +2, -2, -2, +2, \ldots & PR - II \\ 2a_n = \ldots +2, +2, -2, -2, +2, +2, \ldots & PR - IV, \end{cases} \quad (20)$$

$$\dot{x}_n = \begin{cases} (-\pi/T)a_{n-2} & PR - II \\ (-\pi/T)a_{n-1} & PR - IV \end{cases} = -(\pi/2T)x_{n-1} \quad (21)$$

For $|\tau| < T/2$, sine $(x_n) =$ sine$[x(nT+\tau)]$, suggesting to obtain with a threshold equal to zero the two-level reconstructed sample $\hat{x}_n = 2$ sine $[y_n(\tau)]$. However, if sampling occurs halfway between the desired instants, $\hat{x}_n$ is determined by a received sample with a zero signal part, i.e. noise only, and the aforementioned hangup effect is observed.

Reconstructing $$\hat{x}_n = 2 \text{ sine } [y_n(\tau) - \eta_n] \quad (22)$$

with a variable threshold $$\eta_n = \epsilon \text{ sine } (\hat{x}_{n-2}), \quad (23)$$

where $\epsilon > 0$, increases the likelihood that $\pm \hat{x}_n = \mp \hat{x}_{n-2}$ as should be the case according to (20). This introduces a hysteresis effect that eliminates the hangup problem. Given (21), the reconstructed slope is obtained by $$\hat{\dot{x}}_n = -(\pi/2T)\hat{x}_{n-1}. \quad (24)$$

The timing gradient $\Delta\tau_n$ can now be computed. It is advantageous to compute the sum of two consecutive stochastic gradients (16) in order to reduce variance. This leads to $$\Delta\tau_n = -e_n(\tau)\hat{x}_{n-1} + e_{n-1}(\tau)\hat{x}_n = -y_n(\tau)x_{n-1} + y_{n-1}(\tau) \hat{x}_n, \quad (25)$$

where $x_n = -x_{n-2}$ was substituted in the second term of the first equality and (14) was used to obtain the last one. The constant $\pi/2T$ appearing in (24) has been dropped since it can be absorbed in the loop gains $\alpha$ and $P$.

Figure 4:
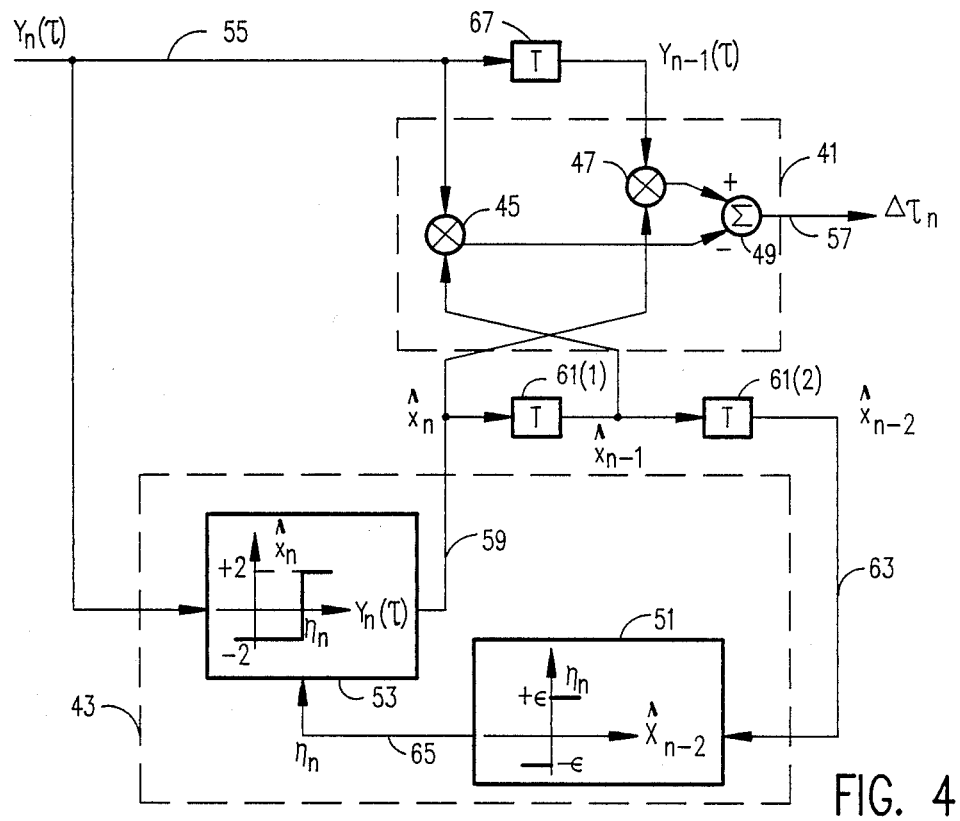
FIG. 4 is a block diagram of a timing gradient generation arrangement for PR-II and PR-IV.

A block diagram of an arrangement for computing the timing gradient $\Delta\tau_n$ from received signal samples $y_n(\tau)$ in case of PR-II or PR-IV signalling is shown in FIG. 4. It comprises a gradient generation portion 41 and a sample reconstruction portion 43. The gradient generation portion includes two multipliers 45 and 47, and an adder 49. The sample reconstruction portion includes two non-linear converters 51 and 53. Received signal samples $y_n(\tau)$ are applied to the input 55 of this arrangement, and the generated timing gradients $\Delta\tau_n$ are obtained at output 57.

The sample reconstruction portion 43 furnishing reconstructed data samples $\hat{x}_n$ on line 59 operates as follows: Each reconstructed data sample $\hat{x}_n$ is delayed by two delay elements 61(1) and 61(2) to make available a previous reconstructed data sample $\hat{x}_{n-2}$ on line 63. This previous reconstructed data sample is applied to converter 51 to obtain either $+\epsilon$ or $-\epsilon$, depending on the sign of the previous reconstructed data sample, thus furnishing a threshold value $\eta_n$ on line 65 in accordance with (23). Converter 53 receives this variable threshold value $\eta_n$ and the received signal sample $y_n(\tau)$ and provides on its output line 59 as reconstructed data sample $\hat{x}_n$ either a value $+2$ or a value $-2$ in accordance with (22).

In the gradient generation portion, multiplier 45 operates on a received signal sample $y_n(\tau)$ and a previous reconstructed data sample $\hat{x}_{n-1}$ furnished by delay element 61(1), and multiplier 47 operates on a delayed received signal sample $y_{n-1}(\tau)$ furnished by delay element 67 and the present reconstructed data sample $\hat{x}_n$ furnished on line 59. These input values are processed by multipliers 45 and 47 and adder 49 in accordance with relation (25) to obtain the timing gradient $\Delta\tau_n$ on output line 57.

The initial values $\hat{x}_{-2}$ and $\hat{x}_{-1}$ which define the thresholds for reconstructing $\hat{x}_0$ and $\hat{x}_1$ can be selected arbitrarily.

One can accumulate $M+1$ terms (25) to obtain $\Delta\tau_n + \Delta\tau_{n-2} + \ldots + \Delta\tau_{n-2M}$ which represents a more general form of the timing gradient that depends on $y_{n-i}$, $i=0$ to $N=2M+1$ and $x_{n-j}$, $j=0$ to $N=2M+1$. The reduction in variance obtained by this averaging does not warrant the increase in computation complexity for M larger than 5. Thus the value of N is limited to 11.

(5) Acquisition of Sampling Phase Timing Gradients for PR-I, PR-III, and EPR-IV

Figure 5:
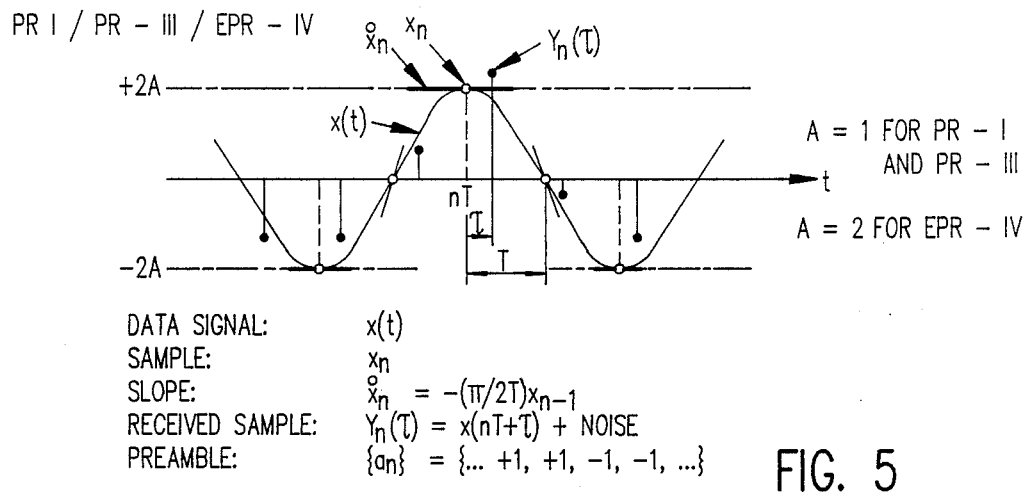
FIG. 5 shows the receiver signals for PR-I, PR-III, and EPR-IV during preamble transmission.

The data and received signals for PR-I, PR-III, and EPR-IV when preamble (19) is transmitted are shown in FIG. 5. As in the case of PR-II and PR-IV, the signal $x(t)$ is a pure sinewave if the excess bandwidth parameter $\zeta \leq 0.5$ and $$x_n = \begin{cases} A(a_n + a_{n-1}) = \ldots 0, +2A, 0, -2A, \ldots & PR - I, EPR - IV \\ A(a_n - a_{n-1}) = \ldots +2A, 0, -2A, 0, \ldots & PR - III. \end{cases} \quad (26)$$

$$\dot{x}_n = \begin{cases} -(A\pi/2T)(a_{n-1} + a_{n-2}) & PR - I, EPR - IV \\ -(A\pi/2T)(a_{n-1} - a_{n-2}) & PR - III \end{cases} = -(\pi/2T)x_{n-1}, \quad (27)$$

where $A = 1$ for PR-I and PR-III and $A = 2$ for EPR-IV. It is now suggested to reconstruct the three-level sample as $$\hat{x}_n = \begin{cases} +2A & \text{for } \eta_n^+ \leq y_n(\tau) \\ 0 & \text{for } \eta_n^- < y_n(\tau) < \eta_n^+, \\ -2A & \text{for } y_n(\tau) \leq \eta_n^- \end{cases} \quad (28)$$

where the thresholds $\eta_n^+$ and $\eta_n^-$ are given by $$\left. \begin{array}{l} \eta_n^+ = \epsilon \text{ sign } (\hat{x}_{n-2}) + \delta, \\ \eta_n^- = \epsilon \text{ sign } (\hat{x}_{n-2}) - \delta. \end{array} \right\} \quad (29)$$

With $\epsilon$ and $\delta > 0$, the likelihood that $\hat{x}_n = \pm 2A$, or 0, respectively, if $\hat{x}_{n-2} = \mp 2A$, or 0, respectively, is increased, resulting in a hysteresis effect that eliminates the hangup problem. Relation (27) shows that $\hat{x}_n$ is again obtained by (24).

In order to reduce variance, it is advantageous to compute the sum of two stochastic gradients (16) separated by 2T, since every second slope is zero, resulting in $$\Delta \tau_n = [-e_n(\tau) + e_{n-2}(\tau)]\hat{x}_{n-1} = [-y_n(\tau) + y_{n-2}(\tau)]\hat{x}_{n-1}, \quad (30)$$

where (14) was used to obtain the last equality. As before, the constant $\pi/2T$ appearing in (24) has been absorbed in the loop gains $\alpha$ and $p$.

Figure 6:
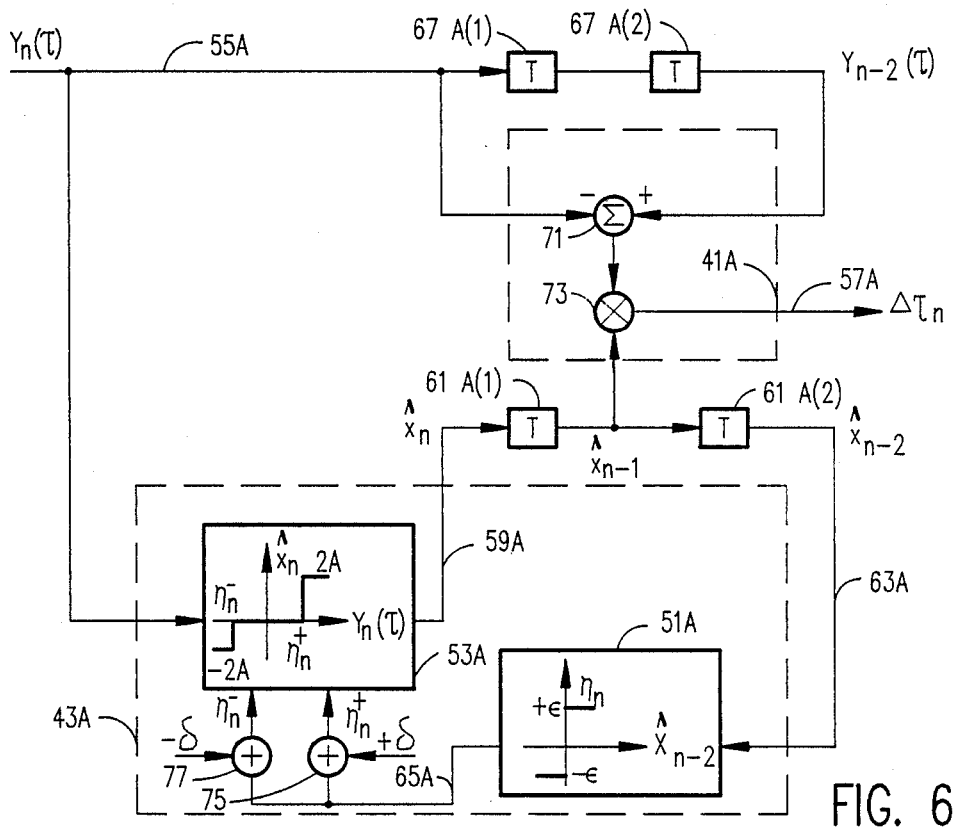
FIG. 6 is a block diagram of a timing gradient generation arrangement for PR-I, PR-III, and EPR-IV.

A block diagram of an arrangement for computing the timing gradient $\Delta \tau_n$ from received signal samples $y_n(\tau)$ in case of PR-I, PR-III, or EPR-IV signalling is shown in FIG. 6. Elements in FIG. 6 which correspond to elements with same function in FIG. 4 are designated by the same reference numbers with an extension "A" (e.g. 41A).

This arrangement comprises a gradient generation portion 41A and a sample reconstruction portion 43A. The gradient generation portion includes an adder 71 and a multiplier 73. The sample reconstruction portion includes two non-linear converters 51A and 53A. Received signal samples $y_n(\tau)$ are applied to the input 55A of this arrangement, and the generated timing gradients $\Delta \tau_n$ are obtained at output 57A.

The sample reconstruction portion 43A furnishing reconstructed data samples $\hat{x}_n$ on line 59A operates as follows: Each reconstructed data sample $\hat{x}_n$ is delayed by two delay elements 61A(1) and 61A(2) to make available a previous reconstructed data sample $\hat{x}_{n-2}$ on line 63A. This previous reconstructed data sample is applied to converter 51A to obtain either $+\epsilon$ or $-\epsilon$, depending on the sign of the previous reconstructed data sample, thus furnishing a basic threshold value $\eta_n$ on line 65A. Two adders 75 and 77 are provided to add to that basic threshold value an increment $+\delta$ or $-\delta$, respectively, thus obtaining two separate threshold values $\eta_n^+$ and in accordance with relation (29). Converter 53A receives these two variable threshold values and the received signal sample $y_n(\tau)$ and provides on its output line 59A as reconstructed data sample $\hat{x}_n$ one of the three possible values $+2A$, 0, or $-2A$, in accordance with (28).

In the gradient generation portion, adder 71 operates on a present received signal sample $y_n(\tau)$ and a previous received signal sample $y_{n-2}(\tau)$ which is obtained from the output of two sequential delay elements 67A(1) and 67A(2), and multiplier 73 operates on the output furnished by adder 71 and a previous reconstructed data sample $\hat{x}_{n-1}$ furnished at the output of delay element 61(1)A, in accordance with relation (30) to obtain the timing gradient $\Delta \tau_n$ on output line 57A.

The initial values $\hat{x}_{-2}$ and $\hat{x}_{-1}$ which define the thresholds for reconstructing $\hat{x}_0$ and $\hat{x}_1$ can be selected arbitrarily.

As mentioned in the previous section, a more general form of the timing gradient can be obtained by accumulating several terms given by (30).

(6) GENERALIZATION

For all PR signalling schemes with excess bandwidth $\zeta \leq 0.5$, preamble (19) creates a pure sinewave of frequency $\frac{1}{4}T$ at the output of the receive filter. The reconstructed data sample $\hat{x}_n$ is obtained by threshold decision; $\hat{x}_n$ is given as in (24) by $-c\hat{x}_{n-1}$ where c is some constant. The sum of N approximated stochastic gradients (16) is used in order to reduce variance. Thus a gradient can be computed in the general case from N received signal samples $y_{n-i}(\tau)$ and N reconstructed data samples $x_{n-j}$, $i = 1 \ldots N-1$ and $j = 1 \ldots N-1$. The decision thresholds are made dependent on past reconstructed data samples $x_{n-j}$, $j = 1 \ldots N-1$ to introduce a hysteresis effect that eliminates the hangup problem.

Figure 7:
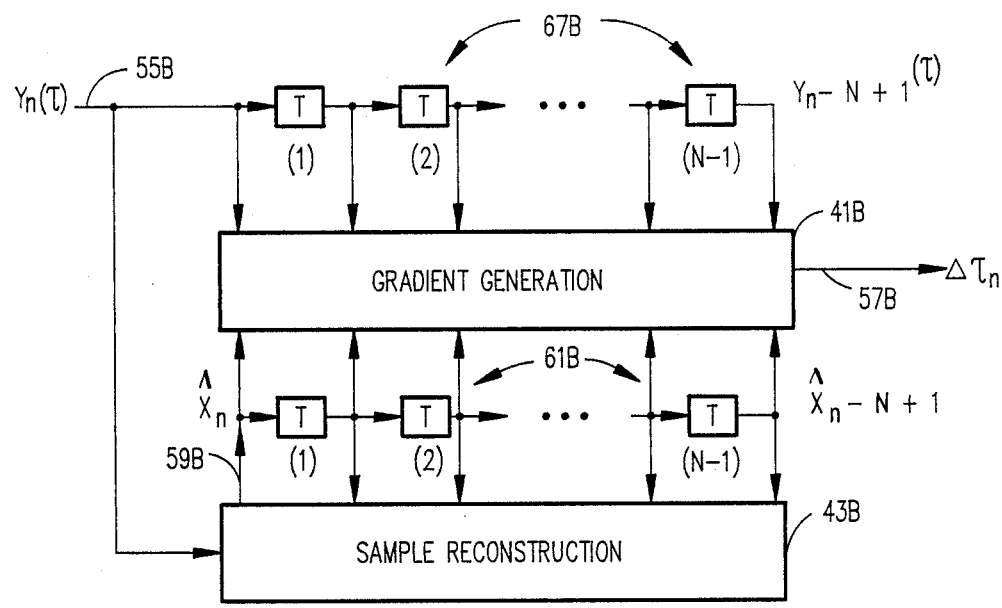
FIG. 7 is a block diagram of a general timing gradient generation arrangement for all PR signalling schemes.

A block diagram of an arrangement for obtaining the timing gradient $\Delta \tau_n$ in the general case is shown in FIG. 7. Elements in FIG. 7 which correspond to elements with same function in FIG. 4 and in FIG. 6 are designated by the same reference numbers with an extension "B" (e.g. 41B).

The arrangement comprises gradient generation portion 41B and sample reconstruction portion 43B. Both portions are connected to the input 55B on which received signal samples $y_n(\tau)$ are furnished, and the generated timing gradients $\Delta \tau_n$ are furnished on output line 57B. A sequence of delay elements 61B(1) through 61B(N-1) is provided for obtaining various previous reconstructed data samples $\hat{x}_{n-1} \ldots \hat{x}_{n-N+1}$ from the present reconstructed data sample $\hat{x}_n$ which is furnished by the sample reconstruction portion on line 59B. These previous reconstructed data samples are furnished to, and can selectively be used by, the gradient generation portion 41B and the sample reconstruction portion 43B. A second sequence of delay elements 67B(1) through 67B(N-1) is provided for obtaining various previous received signal samples $y_{n-1}(\tau) \ldots y_{n-N+1}(\tau)$ from the present received signal sample $y_n(\tau)$, and these previous received signal samples are furnished to and can be selectively used by the gradient generation portion 41B.

We claim:

1. In a receiver for data having been sent or recorded as partial-response (PR) signals, wherein i and j are positive integer time indices and n is an integer time index that may be positive or negative, apparatus for generating a timing gradient value $\Delta \tau_n$ for initially acquiring the sampling phase when a signal resulting from the transmission of a known preamble of the form $+1+1-1-1+1+1 \ldots$ is received, said apparatus comprising:

a common input (55) for received signal samples $y_n$ of a transmitted or recorded PR signal;

first delay means (67) having at least one delay stage, for accepting the present received signal sample $y_n$ and for providing at least one previous received signal sample $y_{n-i}$;

second delay means (61) having at least two delay stages, for accepting a present reconstructed data sample $\hat{x}_n$ and for providing at least a first previous reconstructed data sample $$\hat{x}_{n-j};$$

reconstruction means (43) connected to said common input and to said second delay means for generating said present reconstructed data sample $\hat{x}_n$ in response to said present received signal sample $y_n$ and at least said first previous reconstructed data sample $\hat{x}_{n-j}$; and timing gradient generation means (41) connected to said common input and to said first and second delay means and being responsive to said present received signal sample and to output values of said two delay means, for generating said timing gradient value $\Delta \tau_n$.

2. Apparatus in accordance with claim 1, characterized in that said reconstruction means (43) comprises:

first non-linear conversion means (51) connected to said second delay means (61) for receiving said first previous reconstructed data sample $\hat{x}_{n-j}$, and furnishing on its output (65) one of two possible given values ($+\epsilon$, $-\epsilon$) as threshold $\eta_n$ in response to the sign of said first previous reconstructed data sample $\hat{x}_{n-j}$; and second non-linear conversion means (53) having a first input connected to the output (65) of said first non-linear conversion means for receiving said threshold $\eta_n$, and a second input connected to said common input (55) for receiving a present received signal sample $y_n$, and furnishing on its output (59) one of two possible data amplitude values ($+2$, $-2$) as reconstructed data sample $\hat{x}_n$ in response to the difference between said present received signal sample $y_n$ and said threshold $\eta_n$.

3. Apparatus in accordance with claim 1, characterized in that said first delay means (67) 8c comprises only one delay stage, having a delay of one sampling period, and provides at its output a delayed received signal sample $y_{n-1}$, which constitutes said previous received signal sample $y_{n-i}$, and said second delay means (61) comprises two delay stages (61(1), 61(2)) in series, the first (61(1)) of said delay stages providing at its output a delayed reconstructed data sample $\hat{x}_{n-1}$ as a second previous reconstructed data sample, and the second (61(2)) of said delay stages providing at its output another delayed reconstructed data sample $\hat{x}_{n-2}$ which constitutes said first previous reconstructed data sample $\hat{x}_{n-j}$.

4. Apparatus in accordance with claim 2, characterized in that said timing gradient generation means (41) comprises:

first multiplying means (45) having one input connected to said common input (55) for receiving said present received signal sample $y_n$, another input connected to an output of said second delay means (61) for receiving said second previous reconstructed data sample $\hat{x}_{n-1}$, and having an output;

second multiplying means (47) having one input connected to the output (59) of said second non-linear conversion means for receiving said present reconstructed data sample $\hat{x}_n$, another input connected to said first delay means (67) for receiving said previous received signal sample $y_{n-1}$, and having an output; and subtracting means (49) having its two inputs connected to the outputs of said first and second multiplying means, for subtracting the output of said first multiplying means from the output of said second multiplying means, and furnishing at its own output (57) the generated difference as said timing gradient value $\Delta \tau_n$.

5. Apparatus in accordance with claim 1, characterized in that said reconstruction means (43A) comprises:

first non-linear conversion means (51A) connected to said second delay means (61A) for receiving said first previous reconstructed data sample $\hat{x}_{n-j}$, and furnishing on its output (65A) one of two possible given values ($+\epsilon$, $-\epsilon$) as a basic threshold value in response to the sign of said first previous reconstructed data sample $\hat{x}_{n-j}$;

adding means (75, 77) connected to the output (65A) of said first non-linear conversion means, for adding two different increment values ($+\delta$, $-\delta$) to said basic threshold value, and furnishing two separate threshold values ($\eta_n^+$, $\eta_n^-$) on its outputs; and second non-linear conversion means (53A) having a first and a second input connected to the outputs of said adding means (75, 77) for receiving said two separate threshold values ($\eta_n^+$, $\eta_n^-$), and a third input connected to said common input (55A) for receiving a present received signal sample $y_n$, and furnishing on its output (59A) one of three possible data amplitude values ($+2A$, 0, $-2A$) as reconstructed data sample $\hat{x}_n$ in response to said present received signal sample and said two separate threshold values.

6. Apparatus in accordance with claim 1, characterized in that said first delay means (67A) comprises two delay stages (67A(1), 67A(2)) having a total delay of two sampling time periods, providing at its output a delayed received signal sample $y_{n-2}$, which constitutes said previous received signal sample $y_{n-i}$, and said second delay means (61A) comprises two delay stages (61A(1), 61A(2)) in series, the first (61A(1)) of said delay stages providing at its output a delayed reconstructed data sample $\hat{x}_{n-1}$ as a second previous reconstructed data sample, and the second (61A(2)) of said delay stages providing at its output another delayed reconstructed data sample $\hat{x}_{n-2}$ which constitutes said first previous reconstructed data sample $\hat{x}_{n-j}$.

7. Apparatus in accordance with claim 6, characterized in that said timing gradient generation means (41A) comprises:

subtracting means (71) having one input connected to said common input (55A) for receiving said present received signal sample $y_n$, another input connected to said first delay means (67A) for receiving said previous received signal sample $y_{n-2}$, and having an output for furnishing the difference of its two input values; and multiplying means (73) having one input connected to the output of said first delay stage (61A(1)) of said second delay means for receiving said second previous reconstructed data sample $\hat{x}_{n-1}$, and another input connected to the output of said subtracting means (71) for receiving said difference, and furnishing at its output (57A) the product of its two input values as said timing gradient value $\Delta\tau_n$.

8. A method for acquiring, in response to a received known preamble, the sampling time phase $\tau_n$ in a receiver for data having been sent or recorded as partial-response (PR) signal, wherein i and j are positive integer time indices and n is an integer time index that may be positive or negative, said method comprising the steps of:

(a) sending as said preamble a data sequence of the form $+1+1-1-1+1+1\ldots$; and at each sampling time (b) developing a reconstructed data sample $\hat{x}_n$ from the present received signal sample $y_n$ and at least a first previous reconstructed data sample $\hat{x}_{n-j}$;

(c) developing a stochastic timing phase gradient $\Delta\tau_n$ from the present received signal sample $y_n$, at least one previous received signal sample $y_{n-i}$, and at least a second previous reconstructed data sample $\hat{x}_{n-1}$; and (d) using said stochastic timing phase gradient $\Delta\tau_n$ as a correcting term for obtaining a new timing phase value $\tau_{n+1}$ from a preceding timing phase value $\tau_n$.

9. Method in accordance with claim 8, in which said step (b) comprises the following steps:

selecting one of two given values ($+\epsilon$, $-\epsilon$) as threshold value $\eta_n$ in response to the sign of said first previous reconstructed data sample $\hat{x}_{n-j}$; and selecting, in response to the difference between said threshold value $\eta_n$ and the present received signal sample $y_n$, one of two possible data amplitude values ($+2$, $-2$) as new reconstructed data sample $\hat{x}_n$.

10. Method in accordance with claim 8, comprising the following additional steps:

delaying said present received signal sample $y_n$ by one sample time period to provide a delayed sample $y_{n-1}$ as said previous received signal sample, and delaying said reconstructed data sample $\hat{x}_n$ by one and by two sample time periods to provide a sample $\hat{x}_{n-2}$ as said first previous reconstructed data sample and another sample $\hat{x}_{n-1}$ as said second previous reconstructed data sample; and developing said stochastic timing phase gradient $\Delta\tau_n$ by providing as a first auxiliary value the product of said present received signal sample $y_n$ and said second previous reconstructed data sample $\hat{x}_{n-1}$; providing as a second auxiliary value the product of said previous received signal sample $y_{n-1}$ and said present reconstructed data sample $\hat{x}_n$; and providing a difference value in subtracting said first auxiliary value from said second auxiliary value.

11. Method in accordance with claim 8, in which said step (b) comprises the following steps:

selecting one of two given values ($\epsilon$, $-\epsilon$) as a basic threshold value in response to the sign of said first previous reconstructed data sample $\hat{x}_{n-j}$;

adding a positive ($+\delta$) and a negative ($-\delta$) increment value to said basic threshold value to generate two different threshold values $\eta_n^+$ and $\eta_n^-$ and selecting one of three possible data amplitude values ($+2A$, $0$, $-2A$) as new reconstructed data sample $\hat{x}_n$ depending on whether the present received signal sample $y_n$ is equal to or greater than the greater of said two different threshold values, or has a value between said two different threshold values, or is equal to or less than the smaller of said two different threshold values.

12. Method in accordance with claim 8, comprising the following additional steps:

delaying said present received signal sample $y_n$ by two sample time periods to provide a delayed sample $y_{n-2}$ as said previous received signal sample, and delaying said reconstructed data sample $\hat{x}_n$ by one and by two sample time periods to provide a sample $\hat{x}_{n-2}$ as said first previous reconstructed data sample and a sample $\hat{x}_{n-1}$ said second previous reconstructed data sample; and developing said stochastic timing phase gradient $\Delta\tau_n$ by first providing a difference value in subtracting said present received signal sample $y_n$ previous received signal sample $y_{n-2}$, and by finally providing the product of said difference value and said second previous reconstructed data sample $\hat{x}_{n-1}$.

13. Method in accordance with claim 8, comprising the following additional step:

obtaining a new timing phase value $\tau_{n-1}$ on the basis of the current timing phase value $\tau_n$ and the current timing phase gradient $\Delta\tau_n$ by generating $\tau_{n+1} = \tau_n + k_1 \cdot \Delta\tau_n - \Delta T_n$, where $\Delta T_n = \Delta T_{n-1} + k_2 \cdot \Delta\tau_{n-1}$, and $k_1$ and $k_2$ are preselected constant values; $\tau_O$ being the random timing phase occurring at the beginning of the phase acquisition procedure.

14. Apparatus for computing a timing gradient $\Delta\tau_n$ from a series of received signal samples $y_n$ in a maximum likelihood sequence detection receiver for a partial response channel, wherein i and j are positive integer time indices and n is an integer time index that may be positive or negative, said apparatus comprising:

first delay means (67) for receiving a signal sample $y_n$ and, providing at least one previously received signal sample $y_{n-i}$;

second delay means (61) for receiving reconstructed data sample $\hat{x}_n$ and providing at least one previous reconstructed data sample $\hat{x}_{n-j}$;

reconstruction means (43) connected to said second delay means for generating said reconstructed data sample $\hat{x}_n$ in response to said signal sample $y_n$ and at least said one previous reconstructed data sample $\hat{x}_{n-j}$; and timing means (41) connected to said first and second delay means and responsive to said signal sample $y_n$ and to output values of said two delay means, for generating said timing gradient value $\Delta\tau_n$.

15. Apparatus in accordance with claim 14, wherein, the data sequence is in the form $+1+1-1-1+1+1\ldots$ 16. A method for acquiring, in response to a received known preamble, the sampling time phase $\tau_n$ in a receiver for data sent or recorded as partial-response (PR) signals, wherein i and j are positive integer time indices and n is an integer time index that may be positive or negative, said method comprising the steps, at each sampling time, of:

developing a reconstructed data sample $\hat{x}_n$ from the present received signal sample $y_n$ and at least a first previous reconstructed data sample $\hat{x}_{n-j}$;

developing a stochastic timing phase gradient $\Delta\tau_n$ from the present received signal sample $y_n$, at least one previous received signal sample $y_{n-i}$, and at least a second previous reconstructed data sample $\hat{x}_{n-1}$; and using said stochastic timing phase gradient $\Delta\tau_n$ as a correcting term for obtaining a new timing phase value $\tau_{n+1}$ from a preceding timing phase value $\tau_n$.

* * * * *

UNITED STATES PATENT AND TRADEMARK OFFICE
CERTIFICATE OF CORRECTION

PATENT NO. : 4,890,299

DATED : December 26. 1989

INVENTOR(S) : Francois B. Dolivo, et al

It is certified that error appears in the above-indentified patent and that said Letters Patent is hereby corrected as shown below:

Title page, item [57]

IN ABSTRACT

Line 18   " $\bar{x}_n$ "

should be -- $\hat{x}_n$ --

Line 20   " $\bar{x}_n$ "

should be -- $\hat{x}_n$ --

Column 1   Line 43   " COM-14 "

should be -- COM-34 --

Column 2   Line 52   " $a_n$ "

should be -- $\hat{a}_n$ --

Column 3   Line 2   " applicants'method "

should be -- applicants' method --

Column 3   Line 61   " use "

should be -- used --

UNITED STATES PATENT AND TRADEMARK OFFICE
CERTIFICATE OF CORRECTION

PATENT NO. : 4,890,299  
DATED : December 26, 1989  
INVENTOR(S) : Francois B. Dolivo, et al Page 2 of 7

It is certified that error appears in the above-indentified patent and that said Letters Patent is hereby corrected as shown below:

Column 5  Line 24  Formula 6

" $h_{E,IV}(t) + p(t - T) - p(t - 2T) - p(t - 3T).$ "

should be -- $h_{E,IV}(t) = p(t) + p(t - T) - p(t - 2T) - p(t - 3T).$ --

Column 5  Line 62  Formula 12

" $x_n = \sum_m h_m a_{n-m}$ "

should be -- $\dot{x}_n = \sum_m \dot{h}_m a_{n-m}$ --

Column 5  Line 64  Formula 13  at beginning of formula

" $h_m$ "

should be -- $\dot{h}_m$ --

Column 6  Line 13  " $E\{e_n 2(\tau)\}$ "

should be -- $E\{e_n^2(\tau)\}$ --

Column 6  Line 23  Formula 15

" $\frac{1}{2} \frac{de_n 2(\tau)}{d\tau} = e_n(\tau) y_n(\tau)$ "

should be -- $\frac{1}{2} \frac{de_n^2(\tau)}{d\tau} = e_n(\tau) \dot{y}_n(\tau)$ --

UNITED STATES PATENT AND TRADEMARK OFFICE
CERTIFICATE OF CORRECTION

PATENT NO. : 4,890,299

DATED : December 26, 1989

INVENTOR(S) : Francois B. Dolivo, et al

It is certified that error appears in the above-indentified patent and that said Letters Patent is hereby corrected as shown below:

Column 6   Line 28   " $\hat{y}_n(\tau)$ "

should be   -- $\dot{y}_n(\tau)$ --

Column 6   Line 29   " $\hat{\dot{x}}_n$ "

should be   -- $\dot{\hat{x}}_n$ --

Column 6   Line 32   Formula 16

" $\Delta\tau_n = e_n(\tau)\hat{\dot{x}}_n = [y_n(\tau) - \hat{x}_n]\hat{\dot{x}}_n$ "

should be   -- $\Delta\tau_n = e_n(\tau)\dot{\hat{x}}_n = [y_n(\tau) - \hat{x}_n]\dot{\hat{x}}_n$ --

Column 6   Line 35

" $\hat{\dot{x}}_n$ and $\hat{x}_n$ "

should be   -- $\hat{x}_n$ and $\dot{\hat{x}}_n$ "

Column 6   Line 44   Formula 18

" $\Delta T_{n+1} = \Delta T_n + P\Delta\tau_n.$ "

should be   -- $\Delta T_{n+1} = \Delta T_n + \rho\Delta\tau_n$ "

Column 6   Line 47   " $\alpha$ and $P$ "

should be   -- $\alpha$ and $\rho$ --

UNITED STATES PATENT AND TRADEMARK OFFICE
CERTIFICATE OF CORRECTION

PATENT NO. : 4,890,299

DATED : December 26, 1989

INVENTOR(S) : Francois B. Dolivo, et al

It is certified that error appears in the above-indentified patent and that said Letters Patent is hereby corrected as shown below:

Column 6  Line 51  " $\alpha$ and $P$ "

should be  -- $\alpha$ and $\rho$ --

Column 6  Line 54  " $E\{e_n 2(\tau)\}.$ "

should be  -- $E\{e_n^2(\tau)\}.$ --

Column 7  Line 36  Formula 24  at beginning of formula

" $\hat{x}_n =$ "

should be  -- $\hat{x}_n =$ --

Column 7  Line 44  Formuls 25  after last equal sign

" $- y_n(\tau) x_{n-1} + y_{n-1}(\tau) \hat{x}_n$ "

should be  -- $- y_n(\tau) \hat{x}_{n-1} + y_{n-1}(\tau) \hat{x}_n$ --

Column 7  Line 51  " $P$ "

should be  -- $\rho$ --

Column 9  Line 3  Formula 28  first line of the formula:

" $+ 2\Lambda$  for  $\eta_n +$ "

should be  -- $+ 2\Lambda$  for  $\eta_n^+$ --

UNITED STATES PATENT AND TRADEMARK OFFICE
CERTIFICATE OF CORRECTION

PATENT NO. : 4,890,299             Page 5 of 7
DATED        : December 26, 1989
INVENTOR(S) : Francois B. Dolivo, et al It is certified that error appears in the above-indentified patent and that said Letters Patent is hereby corrected as shown below:

Column 9   Line 5   Formula 28   second line of the formula:

$$" 0 \quad \text{for} \quad \eta_n - < y_n(\tau) < \eta_n + ,"$$

should be -- $0 \quad \text{for} \quad \eta_n^- < y_n(\tau) < \eta_n^+,$ "

Column 9   Line 9   " $\eta_n +$ and $\eta_n -$ "

should be -- $\eta_n^+$ and $\eta_n^-$ --

Column 9   Line 12   Formula 29   at beginning of first line of the formula:

" $\eta_n +$ "

should be -- $\eta_n^+$ --

Column 9   Line 13   Formula 28   at beginning of second line of the formula:

" $\eta_n -$ "

should be -- $\eta_n^-$ --

Column 9   Line 19   " that $\hat{x}_n$ is again "

should be -- that $\hat{x}_n$ is again --

Column 9   Line 60   " increment $+67$ or $-\delta$ "

should be -- increment $+\delta$ or $-\delta$ --

UNITED STATES PATENT AND TRADEMARK OFFICE
CERTIFICATE OF CORRECTION

PATENT NO. : 4,890,299  Page 6 of 7
DATED : December 26, 1989
INVENTOR(S) : Francois B. Dolivo, et al It is certified that error appears in the above-indentified patent and that said Letters Patent is hereby corrected as shown below:

Column 9  Line 62  " $\eta_n +$ and in accordance "

should be -- $\eta_n^+$ and $\eta_n^-$ in accordance --

Column 10  Line 24  " $\hat{x}_n$ is given as in "

should be -- $\hat{x}_n$ is given as in --

Column 10  Line 29  " $x_{n-j}$ "

should be -- $\hat{x}_{n-j}$ --

Column 10  Line 31  " $x_{n\ j}$ "

should be -- $\hat{x}_{n\ j}$ --

Column 11  Line 50  " means (67) 8c comprises "

should be -- means (67) comprises --

Column 12  Line 33  " $(\eta_n +, \eta_n -)$ "

should be -- $(\eta_n^+, \eta_n^-)$ --

Column 12  Line 37  " $(\eta_n +, \eta_n -)$ "

should be -- $(\eta_n^+, \eta_n^-)$ --

UNITED STATES PATENT AND TRADEMARK OFFICE
CERTIFICATE OF CORRECTION

PATENT NO. : 4,890,299

DATED : December 26, 1989

INVENTOR(S) : Francois B. Dolivo, et al

It is certified that error appears in the above-indentified patent and that said Letters Patent is hereby corrected as shown below:

Column 13 Line 16 " signal. "

should be -- signals. --

Column 14 Line 24 " $y_n$ previous "

should be -- $y_n$ from said previous --

Signed and Sealed this

Nineteenth Day of October, 1993

*Attest:*

BRUCE LEHMAN

*Attesting Officer*     *Commissioner of Patents and Trademarks*